United States Patent [19]

Tomosue

[11] Patent Number: 5,377,583
[45] Date of Patent: Jan. 3, 1995

[54] YOLK CUP FOR EGG BREAKING APPARATUS

[75] Inventor: Shigeo Tomosue, Tsuyama, Japan

[73] Assignee: Kyowa Machinery Co. Ltd., Okayama, Japan

[21] Appl. No.: 228,368

[22] Filed: Apr. 15, 1994

[30] Foreign Application Priority Data

Apr. 23, 1993 [JP] Japan .................. 5-120773
Apr. 26, 1993 [JP] Japan .................. 5-123380

[51] Int. Cl.⁶ ........................................ A23J 1/09
[52] U.S. Cl. ........................... 99/500; 99/497; 99/499
[58] Field of Search ................... 99/495–500, 99/568, 577–582; 426/490, 614, 478–480

[56] References Cited

U.S. PATENT DOCUMENTS

| 2,212,502 | 8/1940 | Leahey | 146/2 |
| 2,523,777 | 9/1950 | Polcar | 146/2 |
| 4,111,111 | 9/1978 | Willsey | 99/499 |
| 4,321,864 | 3/1982 | Willsey | 99/500 |
| 4,534,284 | 8/1985 | Fujimura et al. | 99/498 |
| 4,541,330 | 9/1985 | Fujimura | 99/500 |
| 4,799,423 | 1/1989 | Willsey | 99/500 |
| 5,293,815 | 3/1994 | Tomosue | 99/498 |

FOREIGN PATENT DOCUMENTS 2067391 7/1981 United Kingdom ............ 99/497

Primary Examiner—Timothy F. Simone
Attorney, Agent, or Firm—Marks and Murase; Michael D. Bednarek

[57] ABSTRACT

A yolk cup is provided for use in an egg breaking apparatus. The yolk cup is pivotable between a substantially horizontal position and an inclined position. In the horizontal position, the yolk cup receives an egg content including a yolk and an albumen, the yolk cup being provided with a discharge device for selectively discharging the albumen while retaining the yolk when the yolk cup is held in the horizontal position. The discharge device comprises a yolk discharge opening elongated horizontally for discharging the yolk when the yolk cup is pivoted to the inclined position.

8 Claims, 6 Drawing Sheets

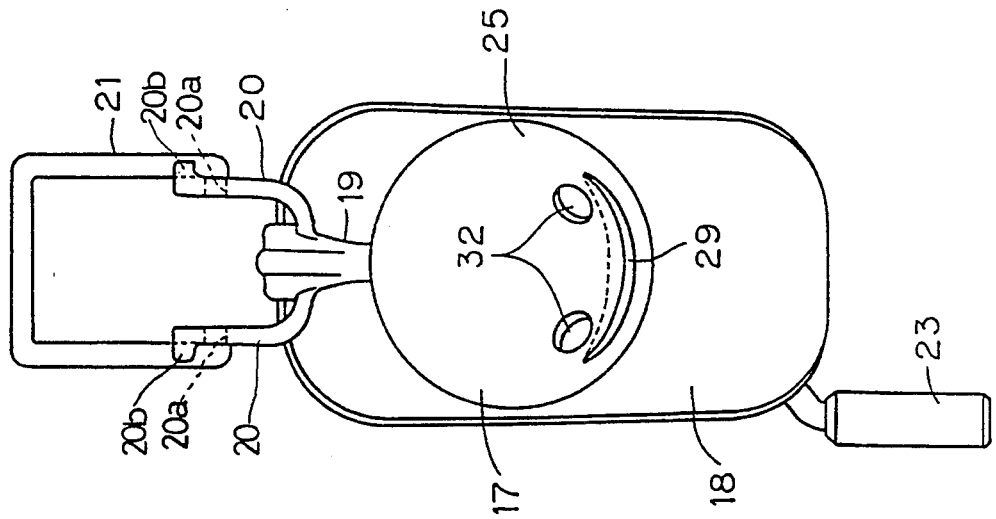
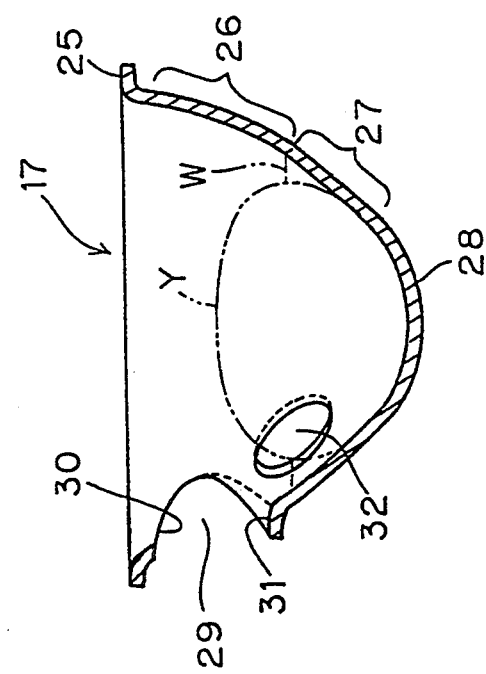

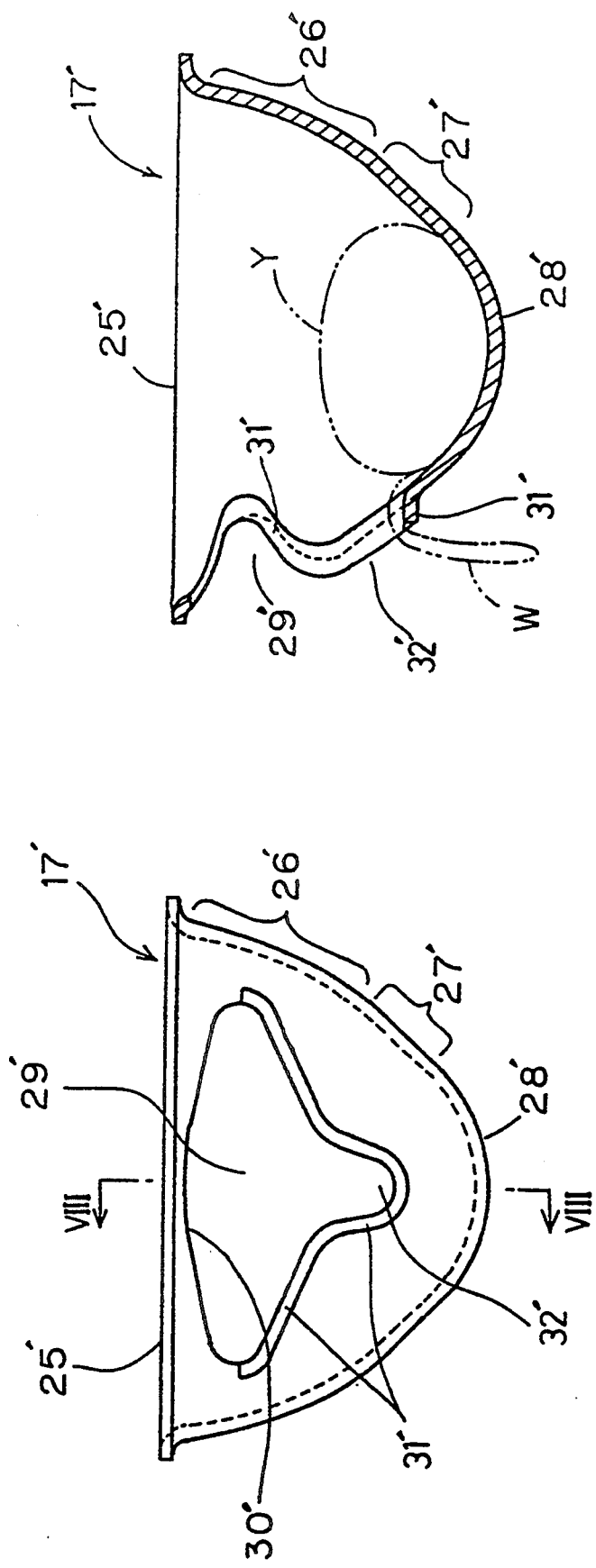

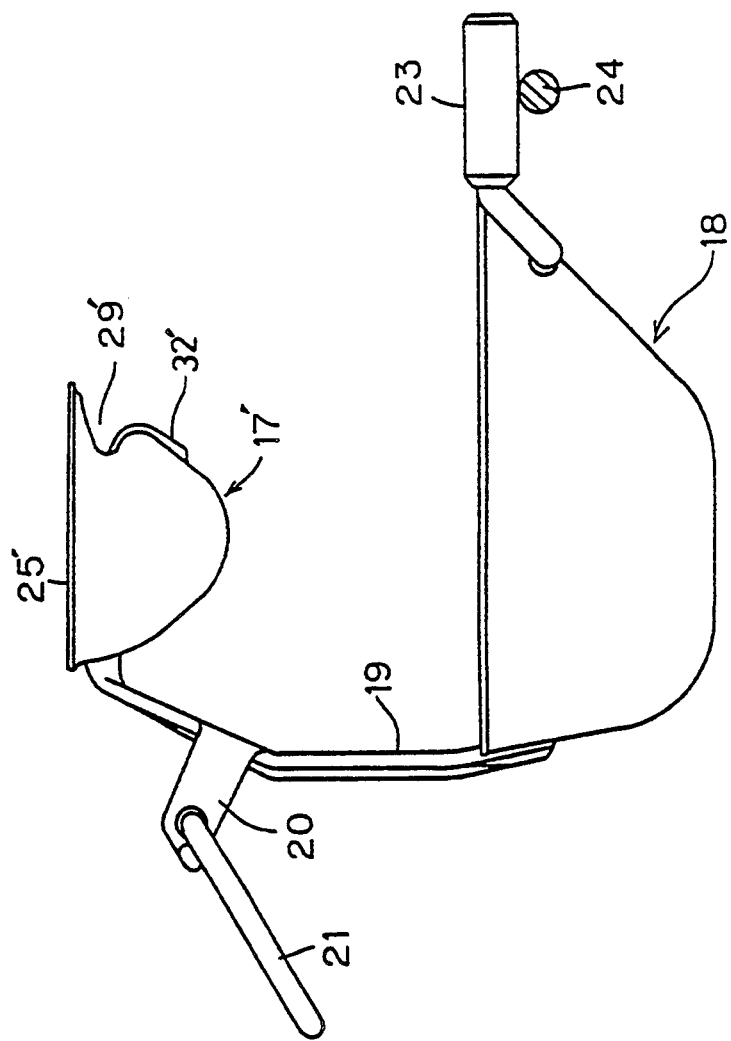
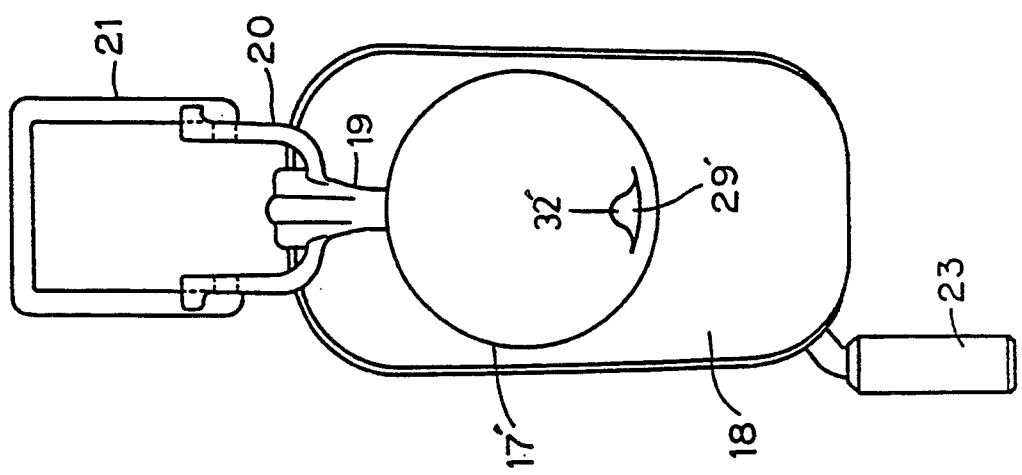

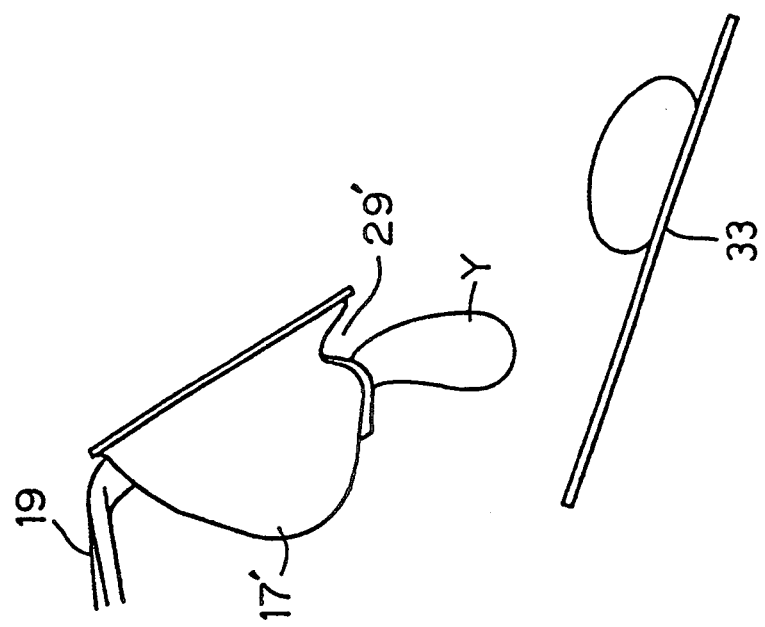

YOLK CUP FOR EGG BREAKING APPARATUS

BACKGROUND OF THE INVENTION

1. Field of the Invention

This invention relates to a yolk cup which can be advantageously incorporated in an automatic egg breaking apparatus. More specifically, the present invention relates to a yolk cup of the type which receives the content of an automatically broken egg and separately discharges the yolk and albumen of the egg content.

2. Description of the Prior Art

As is well known, eggs have found wide use. For example, the egg yolk may be used as a material for making mayonnaise or other food products. The egg white (albumen) may be used for making pharmaceutical products or as a binder for protein products. Due to such wide use of the egg, it is absolutely necessary in industry to use an automatic egg breaking apparatus for breaking eggs and taking out their contents at high speed. Further, since the two different parts of the egg content have different applications, it is also necessary to automatically separate the yolk and albumen.

U.S. Pat. No. 4,111,111 to Willsey discloses a cup assembly used in an automatic egg breaker for separating the content of an automatically broken egg. More specifically, the cup assembly comprises an upper yolk cup (separating cup) and a lower albumen cup. The yolk cup has a V-shaped groove at a front portion of the yolk cup, and a separate slot at a rear portion of the yolk cup. When the yolk cup receives the egg content, the egg albumen is discharged gravitionally through the V-shaped groove and through the slot for falling into the lower albumen cup while retaining the egg yolk. Further, the yolk cup is pivotable to assume a laterally inclined position for discharging the egg yolk over the top brim of the yolk cup.

According to the prior art arrangement described above, the V-shaped groove is used only for selectively discharging the egg albumen, and the egg yolk is discharged over the top brim of the yolk cup by laterally pivoting the yolk cup. Thus, it is necessary to later pivot the albumen cup forwardly downward for discharging the albumen from the albumen cup. In other words, the egg yolk and the egg albumen must be discharged from the respective cups by two different pivotal movements with a time difference. As a result, the efficiency of the automatic egg breaker as a whole becomes relatively low.

While it is conceivable to use the V-shaped groove also for discharging the egg yolk by pivoting the yolk cup forwardly downward without prior lateral pivoting. In this case, however, the yolk sac is likely to be damaged by coming into rubbing contact with the edges of the V-shaped groove.

Further, the prior art yolk cup is also disadvantageous in that the V-shaped groove inevitably forms a discontinuity of the upper brim. Thus, the yolk cup may be easily deformed by contact with external objects.

SUMMARY OF THE INVENTION

It is, therefore, an object of the present invention to provide an egg cup which is capable of efficiently separating the yolk and albumen of an egg content in a short time with less likelihood of damaging the yolk.

According to the present invention, there is provided a yolk cup for an egg breaking apparatus, the yolk cup being pivotable between a substantially horizontal position and an inclined position, the yolk cup in the horizontal position receiving an egg content including a yolk and an albumen, the yolk cup being provided with discharge means for selectively discharging the albumen while retaining the yolk when the yolk cup is held in the horizontal position, wherein the discharge means comprises a yolk discharge opening elongated horizontally for discharging the yolk when the yolk cup is pivoted to the inclined position.

Preferably, the yolk discharge opening may be generally ellipsoidal. However, the yolk discharge opening may be otherwise shaped as long as it is horizontally elongate for smoothly discharging the egg yolk.

According to an embodiment of the present invention, the discharge means further comprises a plurality of albumen discharge opening formed under the yolk discharge opening separately therefrom. In this case, the yolk discharge opening may have a lower margin which is bent outwardly to provide a rounded guide for smoothly discharging the yolk.

According to another embodiment of the present invention, the discharge means further comprises a generally U-shaped albumen discharge opening formed under the yolk discharge opening continuously therewith, the U-shaped albumen discharge opening having rounded corner regions for transition to the yolk discharge opening. In this case, the yolk discharge opening and the albumen discharge opening have a combined margin which is bent outwardly to provided a rounded guide for smoothly discharging the yolk.

The yolk cup may advantageously an upper brim which is bent outwardly to provided a rounded inner corner. It is further advantageous if the yolk cup is made to have a cup wall which includes a partially spherical upper portion cross-sectionally reducing downwardly, a frustoconical intermediate portion cross-sectionally reducing downwardly from the upper portion for squeezing out the albumen, and a partially spherical bottom portion cross-sectionally reducing downwardly from the intermediate portion for stably supporting the yolk.

Other objects, features and advantages of the present invention will become apparent from the following detailed description of the preferred embodiments given with reference to the accompanying drawings.

BRIEF DESCRIPTION OF THE DRAWINGS

In the accompanying drawings:

FIG. 3 is a sectional view taken along lines III—III in FIG. 2;

FIG. 4 is a top plan view showing the same cup assembly;

FIG. 7 is an enlarged front view showing a yolk cup according to a second embodiment of the present invention;

FIG. 8 is a sectional view taken along lines VIII—VIII in FIG. 7;

FIG. 9 is a top plan view showing a cup assembly which incorporates the yolk cup of FIG. 7;

FIG. 10 is a side view showing the same cup assembly; and

FIG. 11 is a side view showing the yolk cup of the same cup assembly at the time of discharging the yolk portion of an egg.

DETAILED DESCRIPTION OF THE PREFERRED EMBODIMENTS

Figure 1:
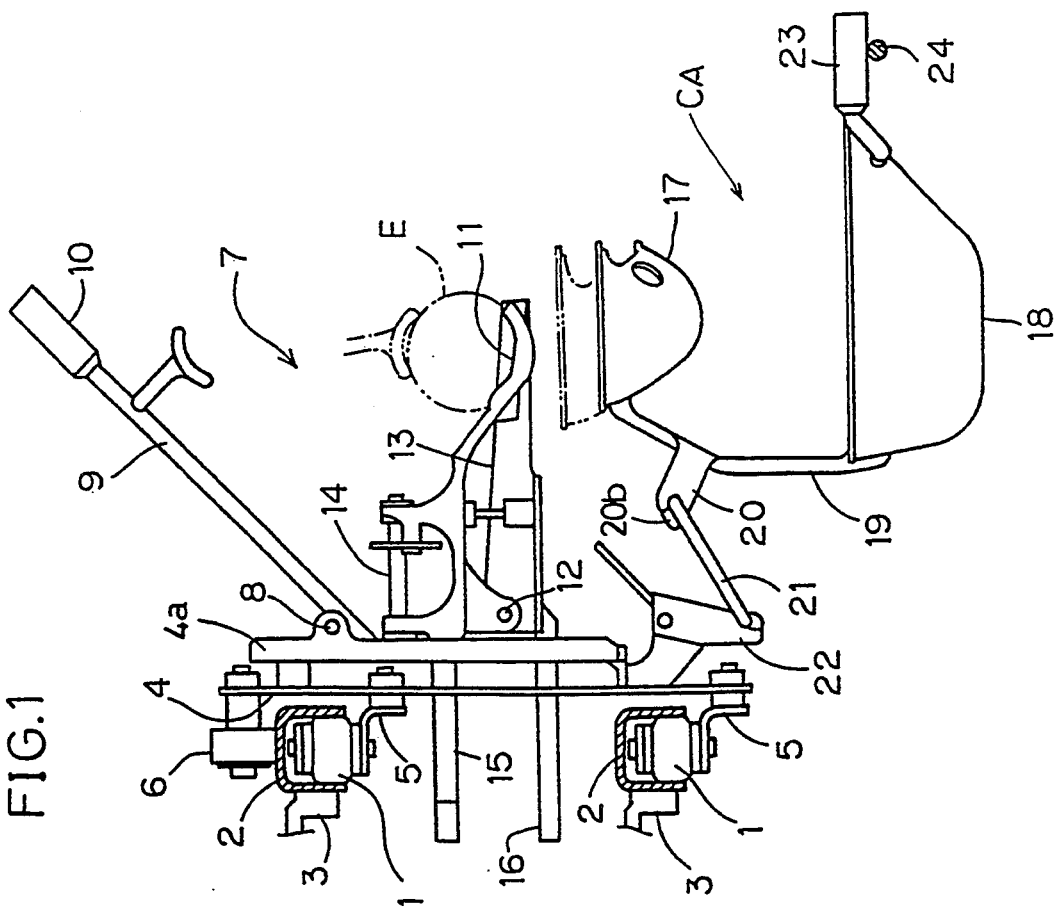
FIG. 1 is a side view schematically showing a cup assembly according to a first embodiment of the present invention together with an associated egg breaking mechanism.

Referring first to FIG. 1 of the accompanying drawings, there is shown a vertically spaced pair of endless chains 1 which is held in engagement with a sprocket assembly (not shown) for movement along a predetermined travel path. The pair of endless chains 1 is slidably received by guide rails 2 which are fixed to an unillustrated machine base via mounting lugs 3 and other support elements (not shown).

Each of the guide rails 2 is a channel member which is downwardly open for receiving a corresponding one of the chains 1. Each of the chains 1 is fixedly connected to a plurality of holders 4 (only one shown) by means of angle plates 5 as suitably spaced along the chain travel path. Each of the holders 4 has an upper end provided with a roller 6 which rolls on the upper one of the guide rails 2.

Each of the holders 10 removably carries an egg breaking mechanism 7 which comprises a mechanism mount 4a. The egg breaking mechanism 7 further comprises an egg presser 9, an egg receiver 11, and a knife assembly 13.

The egg presser 9 functions to downwardly press an egg E against the egg receiver 11 for holding. For this purpose, the egg presser 9 is pivotally connected to the mechanism mount 4a by means of a horizontal shaft 8, and has a follower end portion 10 slidably guided by a cam track (not shown) for controlling the pivotal movement of the egg presser 9.

The egg receiver 11 has a pair of receiver members (only one shown) pivotally supported on a common central shaft 14 extending perpendicularly from the mechanism mount 4a. The operation of each receiver member is controlled by a follower rod 15 guided by a cam track (not shown).

The knife assembly 13 comprises a pair of knife members (only one shown) each pivotally connected to a corresponding receiver member 11 by means of a horizontal pin 12. The operation of each knife member is controlled by another follower rod 16 guided by a cam track (not shown).

In operation, the egg breaking mechanism 7 breaks the egg E as it moves along the travel path of the endless chains 1. The operation of the egg breaking mechanism 7 (namely, the egg presser 9, the egg receiver 11 and the knife assembly 13) is controlled by the unillustrated cam tracks, as described previously. It should be appreciated that the egg breaking mechanism 7 itself does not form the subject of the present invention, so that further details of the egg breaking mechanism 7 will not be described here.

As also shown in FIG. 1, each of the holders 10 also carries a cup assembly CA removably by means of a mounting assembly 22. The cup assembly includes an upper yolk cup 17, a lower albumen cup 18, and a cup mount 19. The yolk cup 17 incorporated in the cup assembly CA of FIG. 1 provides a first embodiment of the present invention.

The cup mount 19 is generally bow-shaped or bent at an obtuse angle. The cup mount 19 has an upper mounting end for attachment to the yolk cup 17, and a lower mounting end for attachment to the albumen cup 18. The attachment of the respective cups 17, 18 may be performed by welding for example.

An intermediate portion of the cup mount 19 is integrally formed with a pair of stays 20 projecting obliquely rearward and upward. Each of the stays 20 has a mounting hole 20a for pivotal connection to a pivotal prop 21, and a stopper projection 20b directed laterally outward for abutment with the prop 21 from above.

The yolk cup 17 receives the content of the egg E which has been broken by the egg breaking mechanism 7 above. The yolk cup 17 has an additional function of selectively allowing the egg white portion (albumen) to fall down to the albumen cup 18 while retaining only the egg yolk portion, as described in detail hereinafter.

The albumen cup 18 attached to the lower mounting end of the cup mount 19 is generally in the form of a bath tub. Being located immediately under the yolk cup 17, the albumen cup 18 receives the egg white separated at the yolk cup 17. The albumen cup 18 has a front portion welded to a control rod 23 in sliding contact with a cam track member 24 for controlling the position and inclination of the cup assembly 7.

As more specifically shown in FIGS. 2 through 6, the upper yolk cup 17, which may be an integral body made of stainless steel or synthetic resin, has a brim 25 which is bent outwardly to have a rounded inner corner. Such a rounded brim is effective for preventing breakage of the yolk sac (vitelline membrane) even if the egg yolk impinges the cup brim 25. Alternatively, the brim 25 may be otherwise rounded. Further, the yolk cup 17 may be dispensed with the rounded brim 25.

Figure 2:
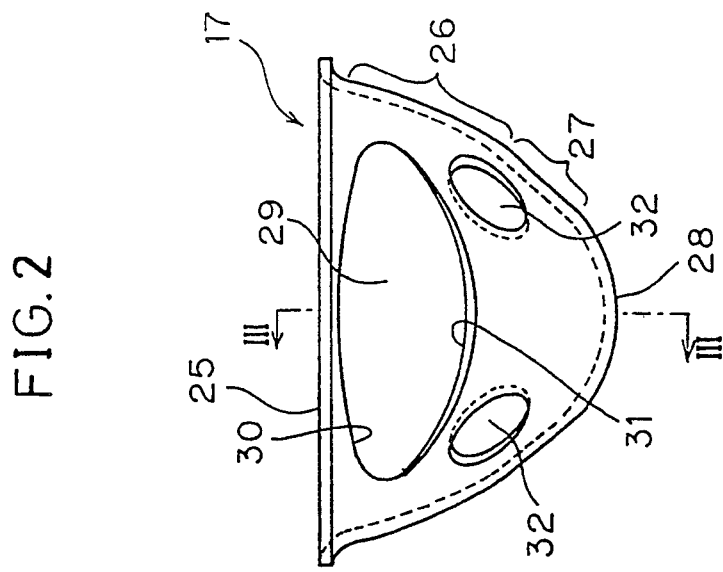
FIG. 2 is an enlarged front view showing a yolk cup incorporated in the same cup assembly.

As seen in FIGS. 2 and 3, the body of the yolk cup 17 has a partially spherical upper portion 26 merging into the rounded brim 25. Further, the yolk cup 17 also has a frustoconical albumen squeezing intermediate portion 27 continuous with the upper portion 26, and a partially spherical bottom portion 28 continuous with the intermediate portion 27.

The upper portion 26 of the yolk cup 17 reduces cross-sectionally toward the intermediate portion 27, but has a minimum cross section which is larger than the cross section of the egg yolk Y (see FIG. 3). The taper angle of the intermediate portion 27 is set such that almost all of the egg albumen W is squeezed out of the yolk cup 17 by pressing contact of the egg yolk Y with the intermediate portion 27 under the gravity of the egg yolk. The curvature of the bottom portion 28 is determined so that the egg yolk Y is supported stably thereon.

The upper portion 26 of the yolk cup 17 is formed with a forwardly directed yolk discharge opening 29 which is generally ellipsoidal and elongate horizontally (namely, having a horizontal longer axis). The yolk discharge opening 29 has an upper margin 30 located adjacent to the brim 25 and curved downward away from the center. The yolk discharge opening 29 also has a lower margin 31 located adjacent to the albumen squeezing intermediate portion 27 and curved downward toward the center. Being thus configured, the yolk discharge opening 29 facilitates discharging the egg yolk Y therethrough.

Figure 6:
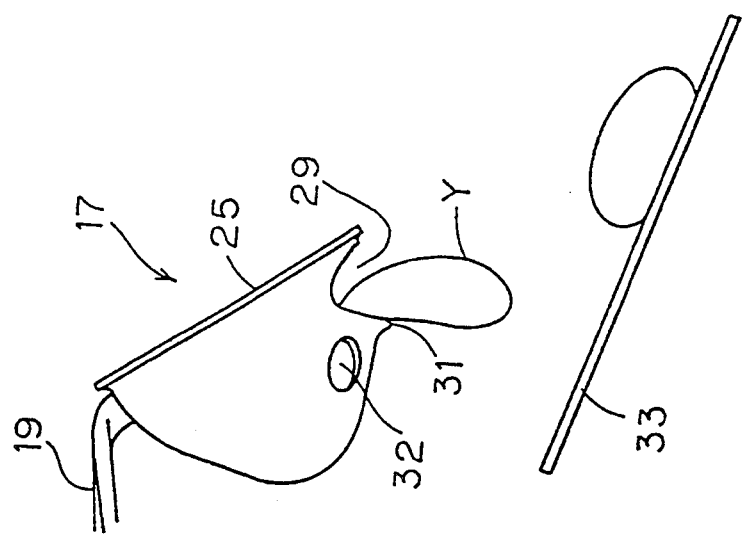
FIG. 6 is a side view showing the yolk cup of the same cup assembly at the time of discharging the yolk portion of the egg.

Preferably, the lower margin 31 is bent forward to provide a rounded guide for smoothly discharging the egg yolk Y with less likelihood of damaging the yolk sac (vitelline membrane) when the yolk cup 17 (namely, the cup assembly CA as a whole) is pivotally tilted forwardly downward, as shown in FIG. 6. Indicated by reference numeral 33 in FIG. 6 is a yolk chute connected to a yolk collector (not shown).

Figure 5:
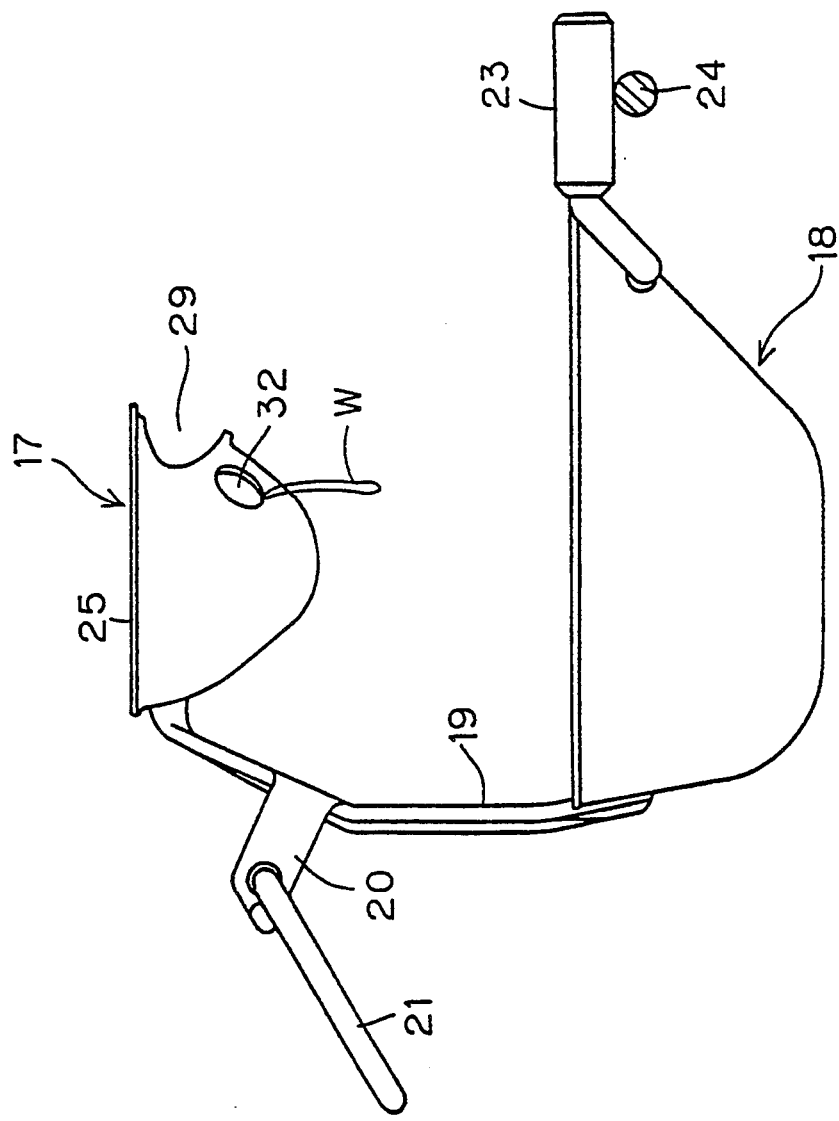
FIG. 5 is a side view showing the same cup assembly at the time of separating the albumen of an egg.

The yolk cup 17 is further formed with a pair of circular albumen discharge openings 32 located immediately below the yolk discharge opening 29. As previously described, since the tapered intermediate portion 27 of the yolk cup 17 is made to come into pressing contact with the egg yolk Y under gravity (see FIG. 3), almost all of the egg albumen W can be effectively squeezed out through the albumen discharge openings 31, as illustrated in FIG. 5. Apparently, the shape, position and number of the albumen discharge openings 32 are optional as long as the intended albumen discharging function is obtainable.

According to the first embodiment described above, the egg yolk Y can be smoothly discharged through the yolk discharge opening 29 which is ellipsoidal and elongate horizontally, whereas the egg white W is effectively discharged through the albumen discharge openings 32. Thus, the separation of the egg content can be performed at a higher speed than conventionally possible.

Further, in separating the egg content, the bent or rounded lower margin 32 of the yolk discharge opening 29 provides a smooth guide for the discharging egg yolk Y, while the squeezing intermediate portion 27 of the yolk cup 17 enables substantially complete expelling of the egg white W. Thus, it is possible to improve the quality (or purity) of the egg yolk collected at the yolk collector.

Moreover, since the upper margin 30 of the yolk discharge opening 29 is continuous, the yolk cup 17 as a whole can be made mechanically stronger than the prior art yolk cup having a V-shaped groove.

FIGS. 7 through 11 show a yolk cup 17' according to a second embodiment of the present invention.

Similarly to the first embodiment, the yolk cup 17' has a brim 25' which is bent outwardly to have a rounded inner corner. Further, the body of the yolk cup 17' has a partially spherical upper portion 26' merging into the rounded brim 25', a frustoconical albumen squeezing intermediate portion 27' continuous with the upper portion 26', and a partially spherical bottom portion 28' continuous with the intermediate portion 27'. The intermediate portion 27' comes into contact with the egg yoke Y (FIG. 8) for squeezing out almost all of the egg albumen W from the yolk cup 17', whereas the bottom portion 28' provides a stable support for the yolk Y.

According to the second embodiment, the upper portion 26' of the yolk cup 17' is formed with a forwardly directed yolk discharge opening 29' which continuous with an albumen discharge opening 32'. Specifically, the yolk discharge opening 29' is generally ellipsoidal and elongate horizontally (namely, having a horizontal longer axis), whereas the albumen discharge opening 32' is generally U-shaped and located centrally under the yolk discharge opening 29'.

An upper half of the yolk discharge opening 29' has an upper margin 30' located adjacent to the brim 25' and curved downward away from the center. An lower half of the yolk discharge opening 29' and the albumen discharge opening 32' have a combined margin 31' which is bent forward to provide a rounded guide for smoothly discharging the egg yolk Y with less likelihood of damaging the yolk sac (vitelline membrane).

According to the second embodiment described above, the egg yolk Y can be discharged mostly through the yolk discharge opening 29' which is ellipsoidal and elongate horizontally (see FIG. 11), whereas the egg white W is effectively discharged through the U-shaped albumen discharge opening 32' (FIG. 8). Further, the combined margin 31', which is bent forward in a rounded manner, provides a smooth guide for the egg yolk Y. Thus, the second embodiment has substantially the same advantages as the first embodiment.

The preferred embodiments of the present invention being thus described, it is obvious that the same may be varied in many ways. For instance, the yolk cup 17, 17' may be incorporated in a differently designed cup assembly and/or combined with a differently designed egg breaking mechanism. Such variations are not to be regarded as a departure from the spirit and scope of the invention, and all such variations as would be obvious to those skilled in the art are intended to be included within the scope of the following claims.

We claim:

1. A yolk cup for an egg breaking apparatus, the yolk cup being pivotable between a substantially horizontal position and an inclined position, the yolk cup in the horizontal position receiving an egg content including a yolk and an albumen, the yolk cup being provided with discharge means for selectively discharging the albumen while retaining the yolk when the yolk cup is held in the horizontal position,
   wherein the discharge means comprises a yolk discharge opening elongated horizontally for discharging the yolk when the yolk cup is pivoted to the inclined position.

2. The yolk cup according to claim 1, wherein the yolk discharge opening is generally ellipsoidal and located at a front portion of the yolk cup, the yolk cup being forwardly tiltable.

3. The yolk cup according to claim 1, wherein the discharge means further comprises a plurality of albumen discharge openings formed under the yolk discharge opening separately therefrom.

4. The yolk cup according to claim 3, wherein the yolk discharge opening has a lower margin which is bent outwardly to provide a rounded guide for smoothly discharging the yolk.

5. The yolk cup according to claim 1, wherein the discharge means further comprises a generally U-shaped albumen discharge opening formed under the yolk discharge opening continuously therewith, the U-shaped albumen discharge opening having rounded corner portions for transition to the yolk discharge opening.

6. The yolk cup according to claim 5, wherein the yolk discharge opening and the albumen discharge opening have a combined margin which is bent outwardly to provided a rounded guide for smoothly discharging the yolk.

7. The yolk cup according to claim 1, wherein the yolk cup has an upper brim which is bent outwardly to provide a rounded inner corner.

8. The yolk cup according to claim 1, wherein the yolk cup has a cup wall which includes a partially spherical upper portion cross-sectionally reducing downwardly, a frustoconical intermediate portion cross-sectionally reducing downwardly from the upper portion for squeezing out the albumen, and a partially spherical bottom portion cross-sectionally reducing downwardly from the intermediate portion for stably supporting the yolk.

* * * * *